US009195645B2

(12) United States Patent
Grieves et al.

(10) Patent No.: US 9,195,645 B2
(45) Date of Patent: Nov. 24, 2015

(54) GENERATING STRING PREDICTIONS USING CONTEXTS

(75) Inventors: Jason Grieves, Redmond, WA (US); Gleb Krivosheev, Redmond, WA (US); Dmytro Rudchenko, Bellevue, WA (US); Parthasarathy Sundararajan, Bellevue, WA (US); Tim Paek, Sammamish, WA (US); Itai Almog, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 440 days.

(21) Appl. No.: 13/561,095

(22) Filed: Jul. 30, 2012

(65) Prior Publication Data
US 2014/0032206 A1 Jan. 30, 2014

(51) Int. Cl.
*G06F 17/27* (2006.01)
*G06F 3/023* (2006.01)

(52) U.S. Cl.
CPC ............ *G06F 17/276* (2013.01); *G06F 3/0237* (2013.01)

(58) Field of Classification Search
CPC .................................................. G10L 2015/228
USPC ............................................................ 704/9
See application file for complete search history.

(56) References Cited

U.S. PATENT DOCUMENTS

| | | | |
|---|---|---|---|
| 6,377,965 B1 | 4/2002 | Hachamovitch et al. | |
| 8,862,467 B1 * | 10/2014 | Casado et al. | 704/235 |
| 8,909,569 B2 * | 12/2014 | Spivack et al. | 706/12 |
| 8,949,361 B2 * | 2/2015 | Nicolaou et al. | 709/206 |
| 8,977,548 B2 * | 3/2015 | Shostak | 704/251 |
| 2007/0078642 A1 * | 4/2007 | Weng et al. | 704/4 |
| 2007/0094008 A1 * | 4/2007 | Huang et al. | 704/9 |
| 2008/0098115 A1 * | 4/2008 | Bouillet et al. | 709/227 |
| 2008/0195388 A1 | 8/2008 | Bower et al. | |
| 2009/0070113 A1 * | 3/2009 | Gupta et al. | 704/257 |
| 2009/0119173 A1 * | 5/2009 | Parsons et al. | 705/14 |
| 2010/0122164 A1 | 5/2010 | Kay et al. | |
| 2010/0131447 A1 * | 5/2010 | Creutz et al. | 706/52 |
| 2011/0087961 A1 | 4/2011 | Fitusi et al. | |
| 2011/0125744 A1 | 5/2011 | Immonen et al. | |

OTHER PUBLICATIONS

"International Search Report", Mailed Nov. 7, 2013, Application No. PCT/US2013/052600, Filed Date Jul. 30, 2013, pp. 1-10.

(Continued)

*Primary Examiner* — Michael N Opsasnick
(74) *Attorney, Agent, or Firm* — Judy Yee; Timothy Churna; Micky Minhas

(57) ABSTRACT

In a mobile device, a context is determined for the mobile device. The context is determined based on a variety of characteristics of the mobile device environment including, for example, the current application being used, any contacts that a user of the mobile device is interacting with or having a conversation with, the current date and/or time, a current topic of the conversation, a current style of the conversation, etc. Based on a set of strings associated with the determined context and user generated text, one or more string predictions are generated for the user generated text. The string predictions may be presented to the user as suggested completions of the user generated text.

20 Claims, 5 Drawing Sheets

(56) References Cited

OTHER PUBLICATIONS

Hawes, et al., "Context-Sensitive Word Selection for Single-Tap Text Entry", Retrieved at <<http://www.cs.bham.ac.uk/~nah/bibtex/papers/hawes04cst9.pdf>> Proceedings of the Second Starting AI Researchers' Symposium, Aug. 2004, pp. 217-222.

Ivanca, Kevin, "Embrace Better Predictive Typing with SwiftKey X for Android", Retrieved at <<http://www.techerator.com/2011/07/embrace-better-predictive-typing-with-swiftkey-x-for-android/>> Retrieved Date: May 8, 2012, pp. 4.

"TouchPal v1.0 for Android will Release Soon", Retrieved at <<http://www.cootek.com/intro-android.aspx>> Retrieved Date: May 8, 2012, pp. 2.

* cited by examiner

GENERATING STRING PREDICTIONS USING CONTEXTS

BACKGROUND

Typing is part of many scenarios on a mobile device, including writing a text message, writing an email, searching for a contact, and typing a URL (uniform resource locator), for example. Typing on a mobile device can be slow and frustrating. This can be especially true when using an on-screen software keyboard.

One solution to this problem is known as a soft input panel. In a soft input panel, a region of the screen may display suggested word predictions based on the characters that a user has entered so far into a text input field. The suggested words change as the user continues to enter characters into the field. When the user sees a word prediction that matches the word that the user is entering, the user may select the word prediction and the selected word is placed in the text input field as a replacement for the characters entered by the user.

Typically, the word predictions shown to the user are generated by matching the entered characters against words in a dictionary, and then presenting a ranked subset of the matching words based on a likelihood that each word is the word that the user intends to enter. The likelihood may be based on the overall probability of usage of each matching word by the general population.

One drawback to such a method for providing word predictions is that it fails to take into account a context associated with the characters being entered. The context may include the application that the user is using (i.e., short message service (SMS) or email application), and the parties that the user is communicating with, a location of the user, the date or time of day, who the user communicated with earlier, or even a mood associated with the user. Typically, a user uses a set of vocabulary that may vary depending on the context of the conversation. For example, a user may use a different set of phrases when in conversations with business contacts than in conversations with friends, or may use a different set of phrases when using an SMS application than when using a word processing application. By not considering the context when generating predictions, the user may receive word predictions that are too broad, or that are inappropriate for the particular context.

SUMMARY

In a mobile device, a context is determined for the mobile device. The context is determined based on characteristics of the mobile device environment and may include, for example, the current application being used, any contacts that a user of the mobile device is interacting with or having a conversation with, the current date and/or time, a current topic of the conversation, a current style of the conversation, etc. Based on a set of strings associated with the determined context and user generated text, one or more string predictions are generated for the user generated text. The string predictions may be presented to the user as suggested completions of the user generated text. Alternatively or additionally, voice notes or emoticons may be generated based on the determined context.

In an implementation, a string is received by a computing device. The received string is associated with an application. A context for the received string is determined by the computing device. String predictions are generated based on the received string and the determined context. Each string prediction comprises a string. One or more of the strings of the string predictions are provided by the computing device. An indication of selection of one of the provided strings is received by the computing device. In response to the indication of selection, the selected string is provided to the application by the computing device.

In an implementation, a context for a received string is determined. It is determined whether a criterion is met by the received string. If the criterion is met by the received string, the received string is added to a plurality of strings associated with the context.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
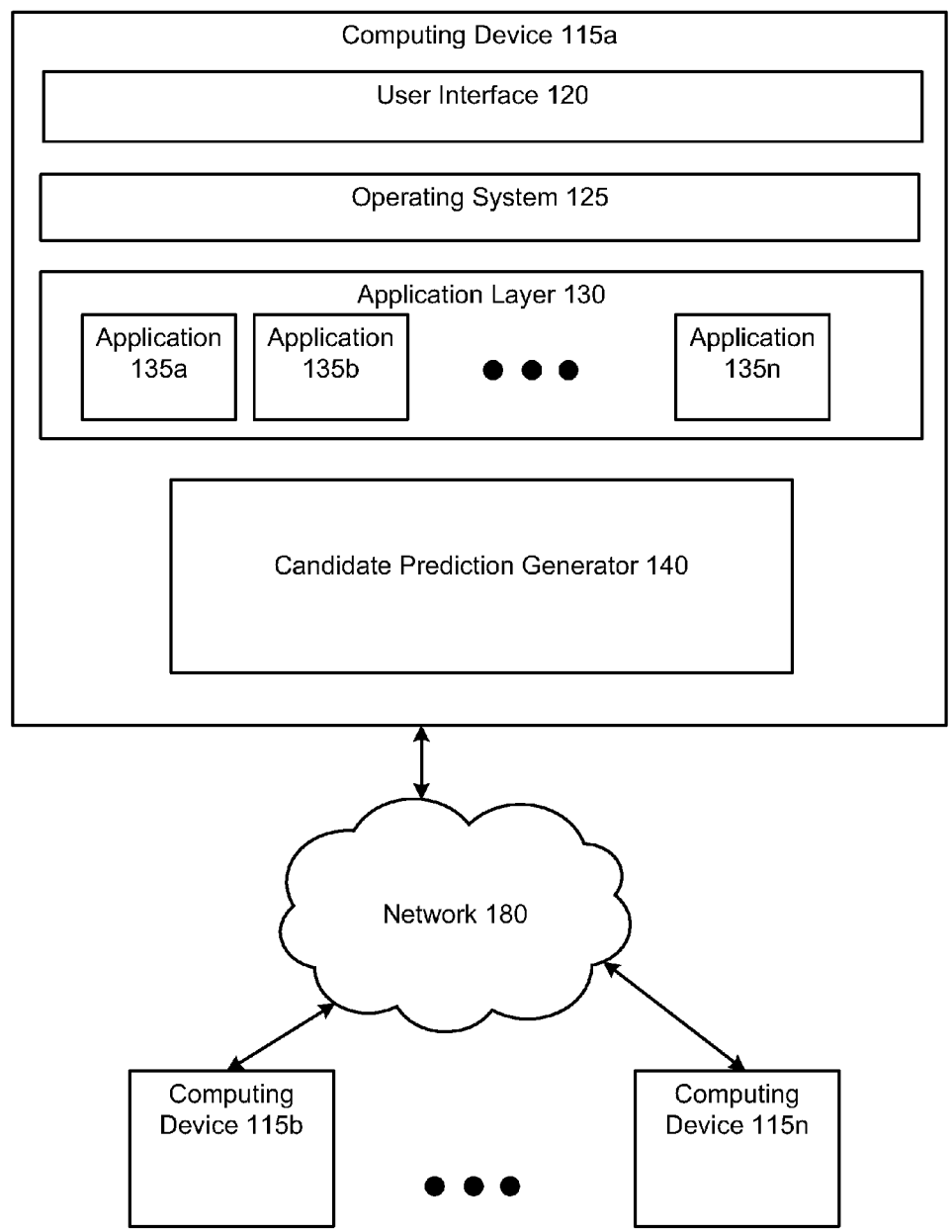
FIG. 1 is an illustration of an example environment for the selection and presentation of string predictions using contexts.

FIG. 1 is an illustration of an example environment 100 for the selection and presentation of string predictions based on contexts. The environment 100 may include a plurality of computing devices 115 (e.g., computing devices 115a-n). The computing devices 115 may be a variety of computing devices including mobile devices such as cell phones, smart phones, portable media players, game consoles, and the like. The computing devices 115 may communicate with one another through a network 180. The network 180 may be a variety of network types including the public switched telephone network (PSTN), a cellular telephone network, and a packet switched network (e.g., the Internet). Examples of suitable computing devices 115 include the computing system 500 described with respect to FIG. 5.

Each of the computing devices 115 may include an operating system 125 and a user interface 120. The operating system 125 may include a variety of well known operating systems. A user of the computing device 115 may use the user interface 120 to input one or more characters to the operating system 125. The user interface 120 may include a variety of interfaces including a software keyboard or a hardware keyboard, for example.

Each of the computing devices 115 may further execute one or more applications 135 (e.g., applications 135a-n). The applications 135 may be executed in an application layer 130. The applications 135 may include email applications, short message service (SMS) or text applications, chat applications, social networking applications, and word processing applications, for example. The computing devices 115 may exchange text-based messages using the applications 135. For example, each computing device may execute an SMS application and may send and receive SMS messages through the application. A sequence of related text-based messages is referred to herein as a conversation.

Each use of a computing device may interact with the applications 135 through the user interface 120 and the operating system 125. In an implementation, a user may enter characters through a soft input panel of the user interface 120. The entered characters may be received by the operating system 125, and may be provided to one or more of the applications 135.

Entering text, character by character, into the user interface 120 may be frustrating for users of the computing devices 115. Accordingly, the computing device 115 may further include a candidate prediction generator 140. The candidate prediction generator 140 may generate one or more string predictions. A string prediction may include a string that the candidate prediction generator 140 predicts that a user intends to enter into the user interface 120. The string prediction may include a confidence value for the string. Alternatively or additionally, the candidate prediction generator 140 may generate voice notes, emoticons, or other communication or message types. The predicted string may include any sequence of one or more characters including, but not limited to, words, phrases, sentences, emoticons, punctuation marks or other symbols, or combinations thereof.

Figure 2:
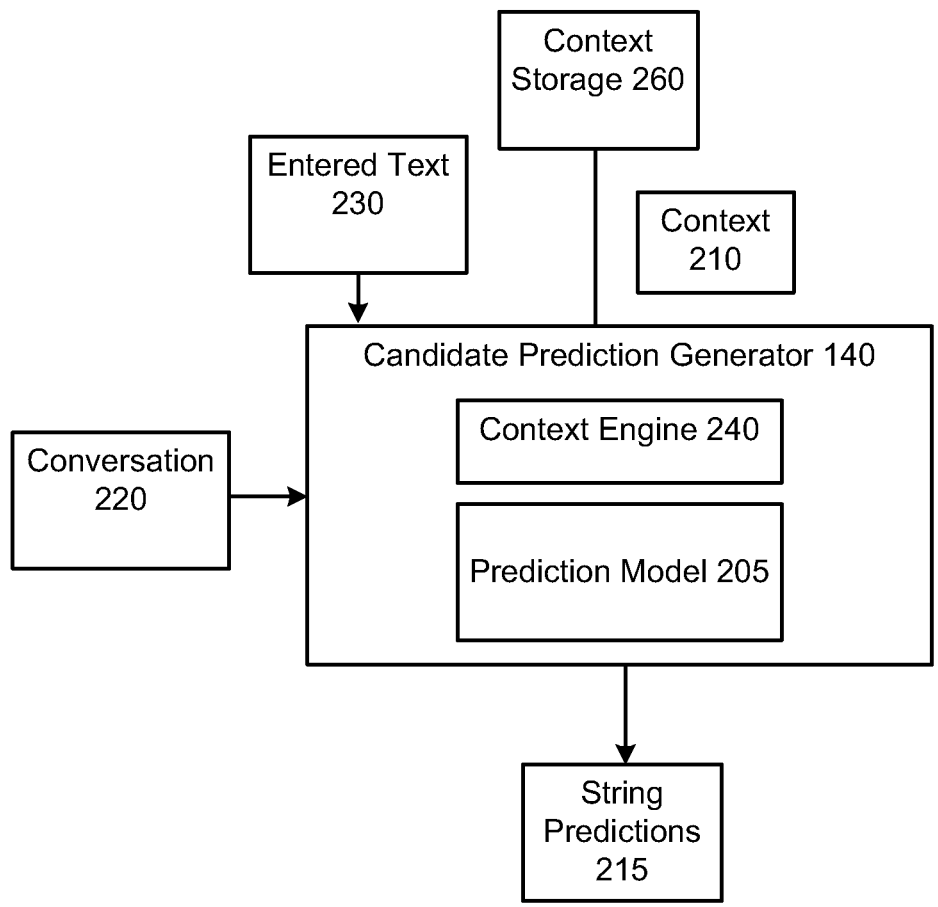
FIG. 2 is an illustration of an example candidate prediction generator.

As described further with respect to FIG. 2, the string predictions may be based in part on one or more contexts associated with the entered character or string. A context as used herein may include one or more characteristics, features, or properties of the conversation or environment that is associated with the entered character or string. The characteristics or features of a context may include the particular application that the received text is for, the parties, contacts, or other users that are participating in the conversation, the current date and/or time, a tone of the conversation (i.e., sad or happy), a topic of the conversation, and a style of the conversation (i.e., formal or informal), a location of the user, users that the user communicated with earlier, and a mood of the user, for example.

Each context may be associated with a set of strings. The set of strings associated with a context may comprise strings that were used or provided during the context by a user, or that are otherwise known to be associated with the context. For example, a context associated with an SMS application may be associated with strings that are frequently used for text messages such as "LOL". A context associated with a date such as January 1, may include strings that are associated with the New Year holiday such as "Happy New Year". A context associated with a particular contact of the user may include one or more strings that the user has entered when interacting with the contact. The strings of the set of strings associated with a context may be associated with a probability. The probability of a string may be based on the number of times that the string was provided by the user, or other users, for the context.

In some implementations, when the user enters one or more characters of a string, the candidate prediction generator 140 may determine the context of the entered string, and may generate a set of string predictions based on the entered string and the determined context. In some implementations, the string predictions may include one or more strings from the set of strings associated with the context that has the entered string as a prefix, or that are otherwise similar to the entered string. Additionally, the string predictions may also include string predictions that were generated based on one or more models such as dictionaries, for example.

By generating string predictions based on a context, rather than solely based on a dictionary or a model, the generated string predictions are not limited to the words and phrases used in the dictionary or the model. Moreover, because the string predictions based on the context may be more narrowly tailored than string predictions based on the dictionary or the model, the strings may more accurately represent the string that the user intends to enter than the strings of the string predictions based on the dictionary or the model.

FIG. 2 is an illustration of an example candidate prediction generator 140. As shown, the candidate prediction generator 140 may include several components, including but not limited to, a context engine 240 and a prediction model 205. Some or all of the components of the candidate prediction generator 140 may be implemented by a computing system, such as the computing system 500 illustrated in FIG. 5.

The candidate prediction generator 140 may receive entered text 230 from the operating system 125. The entered text 230 may include a string or a character and may be text that was provided to an application 135 by a user of a computing device 115. The entered text 230 may be related to, or may be a portion of, a string that the user intends, or intended to, provide to the application 135. For example, the entered text 230 may be the first character of the string that the user intends to enter, or the entered text 230 may be a misspelling of the string that the user intended to enter. Thus, as may be appreciated, the candidate prediction generator 140 may be used to provide both phrase predictions and spelling suggestions to one or more applications 135.

The context engine 240 may determine one or more contexts 210 for the entered text 230, and may retrieve the determined one or more contexts 210 from a context storage 260. In some implementations, each context 210 may include or may be associated with a plurality of strings. The plurality of strings associated with the context 210 may comprise strings that were entered by the user of the computing device 115, or other users of other computing devices 115, for the context 210. For example, for a context 210 associated with a word processing application, the plurality of strings may include one or more strings frequently entered by the user into the word processing application. For a context associated with a conversation style that is formal, the plurality of strings may include one or more strings typically used during formal conversations by the user or other users. In some implementations, the strings of the plurality of strings associated with a context 210 may be based on the strings used by one or more other users of computing devices and may be collected and provided to the context engine 240 by an external administrator. Alternatively or additionally, as described further below, the strings associated with a context 210 may be determined by the context engine 240.

As described above, a context may include one or more characteristics, features, or properties of a conversation 220 or environment that the user is providing the entered text 230 through. In some implementations, the context engine 240 may determine one or more contexts 210 for the entered text 230 by determining the characteristics associated with the entered text 230, and determining one or more contexts 210 of the context storage 260 that match the determined characteristics.

The characteristics of a context 210 may include the type of application 135 that is associated with the entered text 230. The application 135 that is associated with the entered text 230 may be the application 135 that the user is providing the entered text 230 to. The types of applications 135 may include SMS applications, word processing applications, email applications, and social networking applications, for example. Other types of applications may be supported. The context engine 240 may determine the type of the application 135 from the operating system 120, for example.

The characteristics of the context 210 may include time and/or date related characteristics. As may be appreciated, the types of words or phrases that are provided by a user may vary based on the time of day, day of the week, or month, for example. For example, a user may use the phrase "Good Afternoon" in the afternoon and "Good Morning" in the morning. The words or phrases used by a user may be different during the weekend than during a weekday. Similarly, a user may be more likely to use certain holiday related words and phrases such as "Happy St. Patrick's Day" or "Happy Mother's Day" during a period of time surrounding the respective holidays. The context engine 240 may determine the time or date related characteristics from the operating system 120, for example.

The characteristics of a context 210 may further be determined from the conversation 220 associated with the entered text 230. In some implementations, a conversation 220 may include one or more strings from text-based messages generated by the user and one or more other users that are parties to the conversation 220. For example, a conversation 220 may be a series of texts, emails, or social networking messages sent between the user of the computing device 115 and one or more other users of other computing devices 115. In addition, the characteristics of the context may include the entities or parties that are mentioned or brought up during the conversation.

Examples of characteristics of the context 210 that may be determined by the context engine 240 from the conversation 220 associated with the entered text 230 may include one or more parties associated with the conversation 220. For example, a user may be having an email conversation with two friends. The friends may be the parties of the conversation 220. Users may use different words or phrases depending on the parties that they are communicating with (e.g., their mother versus a friend). The context engine 240 may determine the parties to the conversation 220 from the application 135 associated with the entered text 230.

Further examples of characteristics of the context 210 that may be determined by the context engine 240 from the conversation 220 associated with the entered text 230 may include a style or tone of the conversation 220. Examples of the style of the conversation 220 may include formal, informal, or business. Examples of the tone may include serious, sad, happy, and excited. Other tones or styles may be supported. Typically, users use a set of words or phrases in a conversation 220 that match the style or tone of the conversation 220.

The context engine 240 may determine the style or tone of the conversation 220 based on the words or phrases used in the conversation 220. In some implementations, the context engine 240 may look for words or phrases in the conversation 220 that are indicative of the style or tone of the conversation and may determine the style or tone of the conversation 220 based on the determined words. For example, the use of informal words such as "LOL" may indicate that the style of the conversation 220 is informal, and the use of exclamation marks may indicate that the tone of the conversation is likely happy or excited. In some implementations, the context engine 240 may continuously monitor the conversation 220, and may update or change the style or tone of the conversation 220 as the conversation 220 progresses.

Further examples of characteristics of the context 210 that that may be determined by the context engine 240 from the conversation 220 associated with the entered text 230 may include a topic of the conversation 220. Similarly to the style and tone described above, the context engine 240 may determine the topic of the conversation by looking for particular words or phrases in the conversation 220. For example, multiple occurrences of "New York" and "trip" in the conversation 220 may indicate that the conversation 220 is about New York or vacations. The context engine 240 may continuously monitor the conversation 220, and may update or change the topic of the conversation 220 as the conversation 220 progresses.

In some implementations, the context engine 240 may retrieve a context 210 matching each of the determined characteristics from the context storage 260. Thus, if the context engine 240 determines that the context 210 associated with the entered text 230 has the characteristics of a formal tone, and the parties to the conversation are the user's parents, then the context engine 240 may retrieve a context 210 from the context storage 260 that has the characteristics of a formal tone, and the parties to the conversation are the user's parents. If no such context 210 exists in the context storage 260, the context engine 240 may select a context 210 with characteristics that are the closest or most similar to the determined characteristics. Alternatively or additionally, rather than retrieving a single context 210 that has all of the determined characteristics from the context storage 260, the context engine 240 may, for each characteristic, retrieve a context 210 that has the characteristic from the context storage 260.

The candidate prediction generator 140 may generate one or more string predictions 215 based on the entered text 230 and the determined one or more contexts 210. In some implementations, the string predictions 215 may be generated by the candidate prediction generator 140 by determining strings from the plurality of strings associated with each of the one or more contexts 210 that have the entered text 230 as a prefix. The confidence values for the determined strings may be determined by the number of the one or more contexts 210 that include the determined strings and the probabilities associated with each string of the one or more contexts 210, for example.

In implementations where the string predictions 215 are used as spelling suggestions, rather than determining strings from the plurality of strings associated with each of the one or more contexts 210 that have the entered text 230 as a prefix, the candidate prediction generator 140 may determine strings from the plurality of strings that are similar to the entered text 230. Any method for determining the similarity of strings may be used. Alternatively, the candidate prediction generator 140 may determine if the entered text 230 includes any possible misspellings of the strings from the plurality of strings associated with each of the one or more contexts 210, and may generate the string predictions 215 using the determined strings.

The candidate prediction generator 140 may provide one or more of the generated string predictions 215. Where there are many string predictions 215, the candidate prediction generator 140 may select which string predictions 215 to provide based the confidence values associated with each string prediction 215. The confidence values may be based on the probabilities associated with each of the strings associated with the determined one or more contexts 210. For phrase prediction implementations, the strings of the provided string predictions 215 may be displayed to the user in a soft input panel of the user interface 120. If the user selects a displayed string, the string may be provided as an input to the application 135.

For spelling suggestion implementations, the strings of the provided string predictions 215 may be displayed near the entered text 230, or as menu selections. If the user selects a displayed string, the selected string may replace the entered text 230 in the application 135.

In addition to the contexts 210, the candidate prediction generator 140 may also generate one or more string predictions 215 using a prediction model 205. In an implementation, the prediction model 205 may comprise a dictionary, and may include a variety of strings (e.g., words or phrases), along with a probability for each string. The probability of each string may reflect the popularity of each string in general usage, for example. The probabilities may have been determined by collecting and analyzing the strings provided by users over a period time for one or more applications 135 in one or more conversations 220, or may be based on an analysis of strings from newspapers, magazines, or other language sources, for example. Other types of models may be used.

In some implementations, the candidate prediction generator 140 may combine the string predictions 215 generated using the one or more contexts 210 with the string predictions 215 generated by the prediction model 205. For example, the candidate prediction generator 140 may select the top string predictions (i.e., with the highest confidence values) generated using the one or more contexts 210 and the top string predictions of the prediction model 205, and combine the selected string predictions.

In other implementations, the candidate prediction generator 140 may generate the one or more string predictions 215 using the one or more contexts 210 and the prediction model 205. For example, the strings of the plurality of strings associated with the one or more contexts 210 may be incorporated into the model 205, or the probabilities associated with the strings in the model 205 may be adjusted based on the strings associated with the one or more contexts 210. Any changes or adjustments made to the prediction model 205 by the candidate prediction generator 140 may be temporary, and may be reversed if the context engine 240 determines one or more different contexts 210.

The context engine 240 may maintain or update determined contexts 210 based on the entered text 230. The context engine 240 may receive a string from an application 135. The string may be a string that was provided to the application, or that was part of a conversation 220 associated with the application 135. For example, a user of the computing device 115 may provide the entered text 230 "May the force be with you" into an SMS application as part of a conversation 220 with a particular party. The context(s) associated with the entered text 230 may be determined by the context engine 240 using the characteristics of the SMS application and the party associated with the conversation 220.

The context engine 240 may determine if a string of the entered text 230 is already part of the strings associated with the one or more contexts 210. Alternatively or additionally, the context engine 240 may determine if a string that is similar to the string of the entered text 230 is already part of the strings associated with each of the one or more contexts 210. Any method for determining similar strings may be used. If the string of the entered text 230 (or a similar string) is already part of the strings associated with the one or more contexts 210, then the probability of the string (or the similar string) in each of the plurality of strings associated with the one or more contexts 210 may be increased. The probability may be increased by a fixed amount, for example.

If the string (or a similar string) of the entered text 230 is not part of the strings associated with the one or more contexts 210, then the context engine 240 may determine whether or not to add the string of the entered text 230 to the plurality of strings associated with the one or more contexts 210. In some implementations, the string of the entered text 230 may be added to the plurality of strings associated with a context 210 if it meets a criterion associated with the context 210. For example, the criterion may be that the string was part of entered text 230 more than a threshold number of times, such as three times. Other threshold times or criteria may be used. Each context 210 may have its own criterion, or the criterion may be the same for each context 210 in the context storage 260. Thus, continuing the example above, the string "May the force be with you" may be added to the context 210 for the SMS applications and the context 210 for the party associated with the conversation 220 if the string "May the force be with you" was received more than three times for each of the contexts 210.

Figure 3:
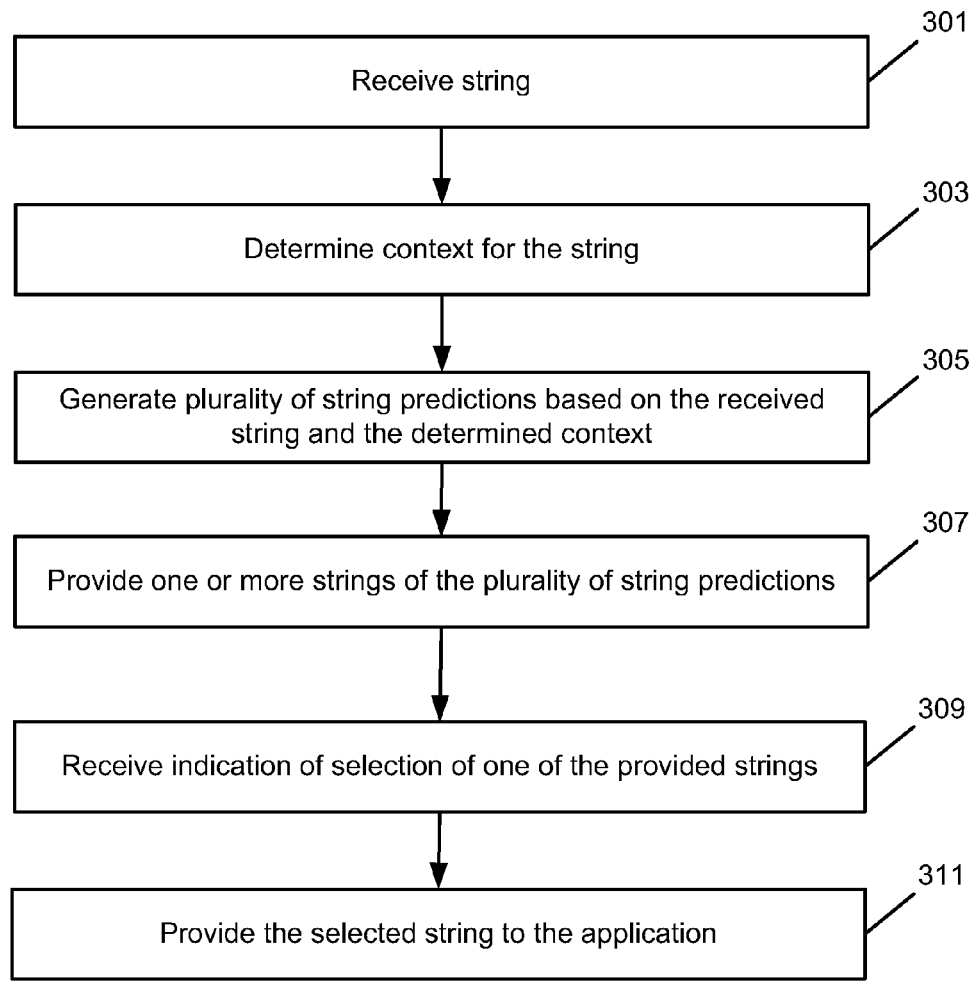
FIG. 3 is an operational flow of an implementation of a method for providing string predictions using contexts.

FIG. 3 is an operational flow of an implementation of a method 300 for providing string predictions using one or more contexts. The method 300 may be implemented by a candidate prediction generator 140 of a computing device 115, for example.

A string is received at 301. The string may be received by the candidate prediction generator 140 from a user through the user interface 120 as the entered text 230. For example, the user may have entered one or more characters into a text field using a software keyboard. The received string may be a prefix of the string that the user intends to provide to an application 135 as part of a conversation 220 with one or more parties. The application 135 may be one or more of an SMS application, a social networking application, and an email application, for example.

A context is determined for the string at 303. The context 210 may be determined by the context engine 240 of the candidate prediction generator 140. The context engine 240 may determine a single context 210 for the received string, or may determine a plurality of contexts 210. The context 210 may be determined from the contexts 210 stored in the context storage 260. Each context 210 may be associated with a plurality of strings that are strings that were frequently provided by the user, or other users, during the particular context 210. Each string of the plurality of strings may also include a probability that is a measure of how frequently that the string was provided during the context 210.

In some implementations, determining the context may include determining the context based on the application 135 associated with the received string, or the date or time associated with the received string. Alternatively or additionally, for example, the context may be based on the conversation 220 associated with the received string, and the context may be determined based on the parties to the conversation, the topic of the conversation, or the style of the conversation. The topic or style of the conversation may be determined by the context engine 240 by looking for strings in the conversation 220 that are indicative of a particular style or topic.

A plurality of sting predictions is generated based on the received string and the determined context at 305. The plurality of string predictions may comprise the string predictions 215 and may be generated by the candidate prediction generator 140 using the received string and the plurality of strings associated with the determined context 210. In some implementations, the string predictions 215 may each include a string from the plurality of strings associated with the determined context 210, and may have been generated by determining strings from the plurality of strings that include the received string as a prefix. Alternatively, the string predictions 215 may have been generated by determining strings from the plurality of strings that are similar to the received string. The string predictions 215 may further each include a confidence value that is based on the probability of the string in the plurality of strings.

In some implementations, the plurality of string predictions 215 may also be generated by the candidate prediction generator 140 using the prediction model 205 and the determined context 210. The prediction model 205 may comprise or be based on a dictionary, for example.

One or more strings of the plurality of string predictions are provided at 307. The one or more strings may be provided according to the confidence values of the string predictions 215 by the candidate prediction generator 140. In some implementations, the strings of the string predictions 215 with the highest confidence values may be provided. The strings may be provided by displaying the strings in a soft input panel of the user interface 120, for example. Where the strings are provided as spelling suggestions for the received string, the strings may be displayed proximate to the received string by the operating system 125.

An indication of selection of one of the provided one or more strings is received at 309. The indication of selection may be received by the operating system 125 from the user interface 125 and may be provided to the candidate prediction generator 140. For example, the user may select or touch one of the strings in the soft input panel of the user interface 120.

The selected string is provided as an input to the application at 311. The selected string may be provided to the application 135 as part of the conversation 220 by the candidate prediction generator 140, or as a spelling replacement for the received string.

In some implementations, the selected string may also be used to update the determined context 210 by the context engine 240 of the candidate prediction generator 140. For example, the probability associated with the selected string in the plurality of strings associated with the determined context 210 may be increased by the context engine 240 of the candidate prediction generator 140.

Figure 4:
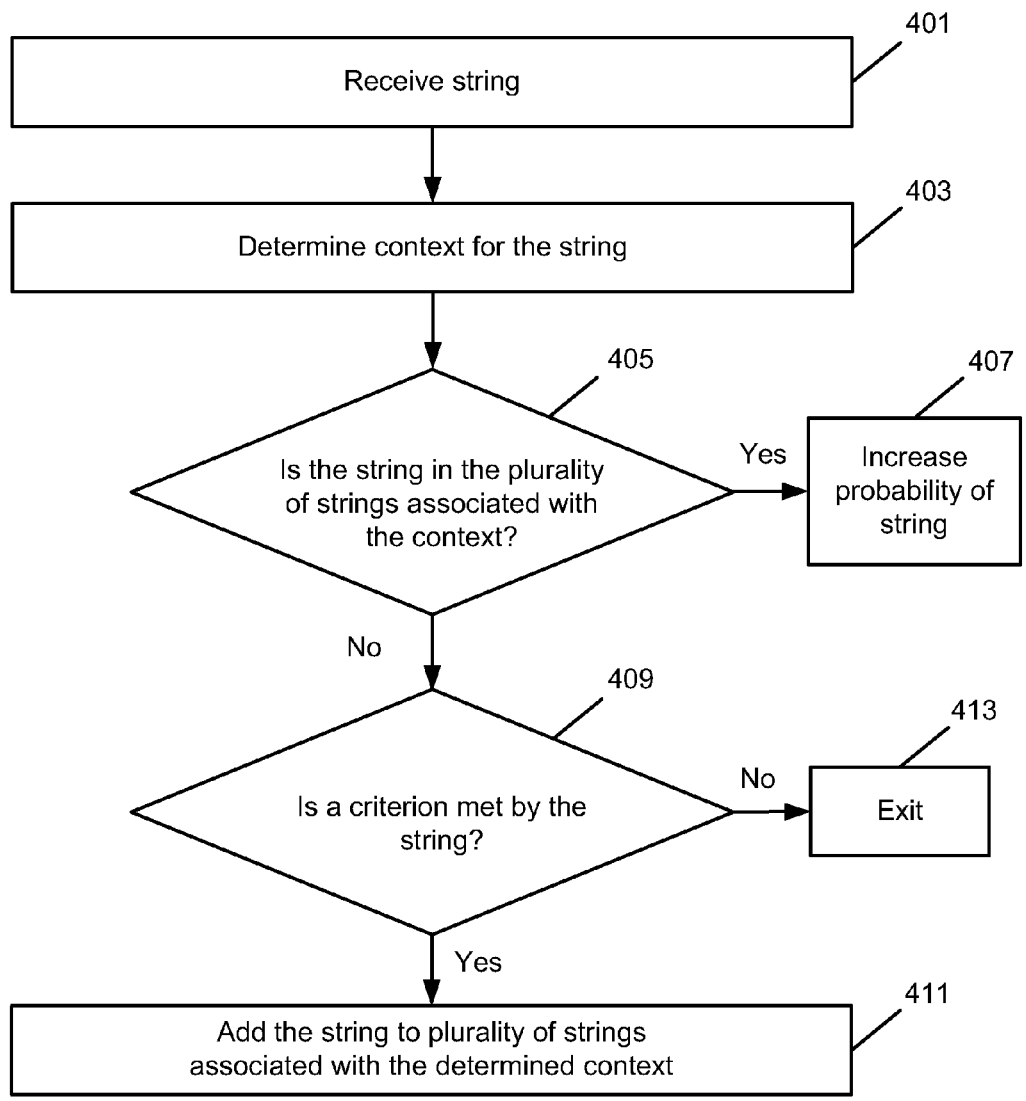
FIG. 4 is an operational flow of an implementation of a method for updating a context.

FIG. 4 is an operational flow of an implementation of a method 400 for updating a context. The method 400 may be implemented by the candidate prediction generator 140, for example.

A string is received at 401. The string may be received by the candidate prediction generator 140 from the operating system 125. The string may have been entered or selected by a user of an application 135. The string may include one or more words or phrases.

A context is determined for the received string at 403. The context 210 may be determined by the context engine 240 of the candidate prediction generator 140. The context 210 may be associated with a plurality of strings that are strings that were frequently provided by the user, or other users, during the particular context 210. Each string of the plurality of strings may also include a probability that is a measure of how frequently that the string was provided during the context 210.

Whether the plurality of strings that is associated with the determined context includes the received string is determined at 405. The determination may be made by the context engine 240 of the candidate prediction generator 140. If the plurality of strings includes the string, the method 400 may continue at 407. Otherwise, the method 400 may continue at 409.

The probability of the string in the plurality of strings is increased at 407. The probability may be increased by the context engine 240 of the candidate prediction generator 140. For example, the context engine 240 may increase the probability by adding a fixed amount to the probability of the received string in the plurality of strings.

Whether a criterion is met by the string is determined at 409. The determination may be made by the context engine 240 of the candidate prediction generator 140. In some implementations, the criterion may be that the string was received more than a threshold number of times. For example, a string may be added to the plurality of strings associated with a determined context 210 after it has been entered or provided by a user to an application 135 more than three times (or another predetermined number of times, depending on the implementation). Other criteria may be used. If the criterion is met, then the method 400 may continue at 411. Otherwise, the method 400 may exit at 413.

The string is added to the plurality of strings associated with the context at 411. The string may be added by the context engine 240 of the candidate prediction generator 140. In some implementations, the probability associated with the added string may be set to a default value for newly added strings, for example.

Figure 5:
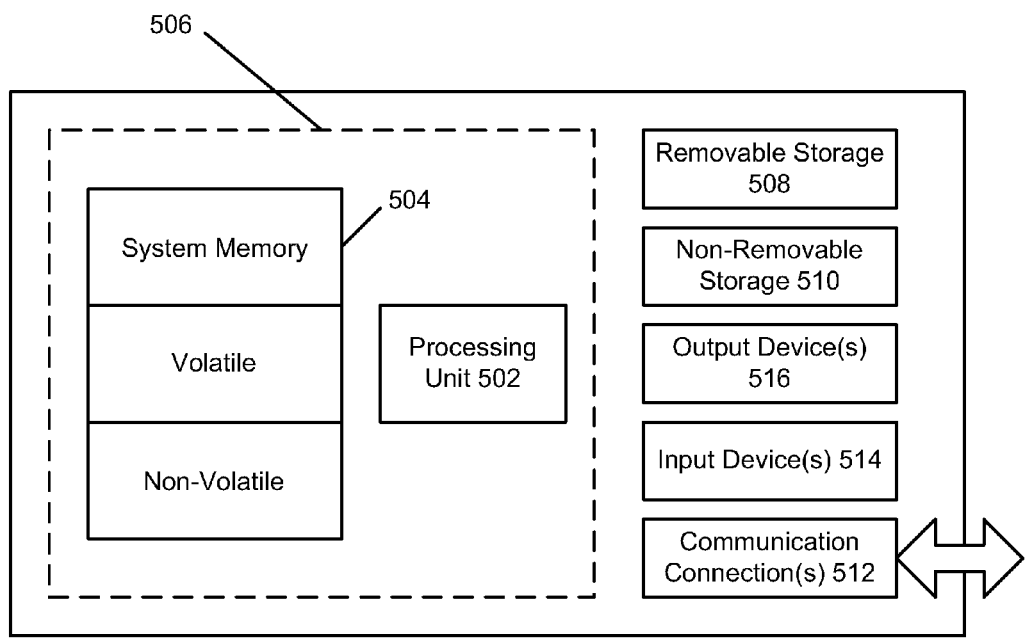
FIG. 5 shows an exemplary computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by computing system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communication connection(s) 512 that allow the device to communicate with other devices and/or interfaces. Computing system 500 may also have input device(s) 514 such as a keyboard (software or hardware), mouse, pen, voice input interface, touch interface, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a string by a computing device, wherein the received string is associated with a conversation between a user of the computing device and one or more parties;
   determining a context for the received string based on a contact associated with one of the one or more parties of the conversation by the computing device, wherein the context includes only a plurality of strings that were entered by the user when the user previously interacted with the contact;
   generating a plurality of string predictions based on the received string and the plurality of strings of the determined context by the computing device, wherein each string prediction comprises a string;
   providing one or more of the strings of the plurality of string predictions by the computing device;
   receiving an indication of selection of one of the provided one or more strings of the plurality of string predictions by the computing device; and
   in response to the indication of selection, providing the selected string to an application by the computing device.

2. The method of claim 1, wherein determining the context for the received string based on the contact associated with one of the one or more parties of the conversation further comprises determining the context based on the application.

3. The method of claim 1, wherein the received string is a character.

4. The method of claim 1, further comprising determining a topic of the conversation, and wherein determining the context for the received string based on the contact associated with one of the one or more parties of the conversation further comprises determining the context for the received string based on the determined topic.

5. The method of claim 1, further comprising determining a style of the conversation, and wherein determining the context for the received string based on the contact associated with one of the one or more parties of the conversation further comprises determining the context for the received string based on the determined style.

6. The method of claim 1 further comprising determining a time or date associated with the received string, and wherein determining the context for the received string based on the contact associated with one of the one or more parties of the conversation further comprises determining the context for the received string based on the time or date associated with the received string.

7. A method comprising:
   receiving a string by a computing device, wherein the received string is associated with a conversation between a user of the computing device and one or more parties;
   determining a context for the received string by the computing device based on a contact associated with one of the one or more parties of the conversation, wherein the context includes only a plurality of strings that were entered by the user when the user previously interacted with the contact;
   determining if a criterion is met by the received string by the computing device; and
   if the criterion is met by the received string, adding the received string to the plurality of strings of the context by the computing device.

8. The method of claim 7, further comprising:
   determining if the received string is in the plurality of strings of the determined context; and
   if so, increasing a probability associated with the received string in the plurality of strings.

9. The method of claim 7, wherein determining the context for the received string based on the contact associated with one of the one or more parties of the conversation further comprises determining the context based on an application.

10. The method of claim 7, further comprising determining a topic of the conversation, and wherein determining the context for the received string based on the contact associated with one of the one or more parties of the conversation further comprises determining the context for the received string based on the determined topic.

11. The method of claim 7, further comprising determining a style of the conversation, and wherein determining the context for the received string based on the contact associated with one of the one or more parties of the conversation further comprises determining the context for the received string based on the determined style.

12. The method of claim 7, further comprising determining a time or date associated with the received string, and wherein determining the context for the received string based on the contact associated with one of the one or more parties of the conversation further comprises determining the context for the received string based on the time or date associated with the received string.

13. A system comprising:
at least one computing device; and
a candidate prediction generator adapted to:
receive a string, wherein the received string is associated with a conversation between a user of the at least one computing device and one or more parties;
determine a context for the received string based on a contact associated with one of the one or more parties, wherein the context includes only a plurality of strings that were entered by the user when the user previously interacted with the contact;
generate a plurality of string predictions based on the received string and the plurality of strings of the determined context, wherein each string prediction comprises a string; and
provide one or more of the strings of the plurality of string predictions.

14. The system of claim 13, wherein the candidate prediction generator is further adapted to:
receive an indication of selection of one of the provided one or more strings of the plurality of string predictions; and
in response to the indication of selection, provide the selected string to an application.

15. The system of claim 13, wherein the candidate prediction generator is further adapted to determine a topic of the conversation, and wherein determining the context for the received string based on the contact associated with one of the one or more parties further comprises determining the context for the received string based on the determined topic.

16. The system of claim 13, wherein the candidate prediction generator is further adapted to determine a style of the conversation, and wherein determining the context for the received string based on the contact associated with one of the one or more parties further comprises determining the context for the received string based on the determined style.

17. The system of claim 13, the candidate prediction generator is further adapted to determine a date or time associated with the received string, and wherein determining the context for the received string based on the contact associated with one of the one or more parties further comprises determining the context for the received string further comprises determining the context for the received string based on the time or date associated with the received string.

18. The method of claim 1, further comprising determining a tone associated with the received string and wherein determining the context for the received string based on the contact associated with the one of the one or more parties of the conversation further comprises determining the context based on the determined tone.

19. The method of claim 18, wherein the determined tone comprises one or more of a formal tone or an informal tone.

20. The method of claim 18, wherein the determined tone comprises one or more of serious, sad, happy, and excited.

* * * * *